(12) United States Patent
Dworatzek

(10) Patent No.: US 7,481,926 B2
(45) Date of Patent: Jan. 27, 2009

(54) FILTER DEVICE

(75) Inventor: Klemens Dworatzek, Edingen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 180 days.

(21) Appl. No.: 11/353,948

(22) Filed: Feb. 15, 2006

(65) Prior Publication Data

US 2006/0219621 A1 Oct. 5, 2006

Related U.S. Application Data

(60) Provisional application No. 60/666,191, filed on Mar. 30, 2005.

(30) Foreign Application Priority Data

Feb. 15, 2005 (DE) ........................ 10 2005 007 022

(51) Int. Cl.
*B01D 27/08* (2006.01)
*B01D 35/14* (2006.01)
(52) U.S. Cl. ........................ 210/232; 210/234; 210/235; 210/443; 210/444; 55/497; 55/498
(58) Field of Classification Search ................. 210/232, 210/234, 235, 443, 444, 450; 55/497, 498
See application file for complete search history.

(56) References Cited

U.S. PATENT DOCUMENTS

| | | | | |
|---|---|---|---|---|
| 2,955,712 | A | * | 10/1960 | Gutkowski .................. 210/234 |
| 3,715,032 | A | * | 2/1973 | Nicko .......................... 210/133 |
| 5,186,829 | A | | 2/1993 | Janik |
| 5,601,710 | A | * | 2/1997 | Yoon et al. .................. 210/232 |
| 5,607,582 | A | * | 3/1997 | Yamazaki et al. ........... 210/234 |
| 5,826,854 | A | * | 10/1998 | Janvrin et al. ............. 251/149.9 |
| 5,914,037 | A | * | 6/1999 | Yen ............................. 210/234 |
| 6,146,527 | A | * | 11/2000 | Oelschlaegel ............... 210/232 |

(Continued)

FOREIGN PATENT DOCUMENTS

DE 44 02 836 A1 8/1995

(Continued)

OTHER PUBLICATIONS

German Search Report dated Aug. 28, 2007 with English translation of relevant portion (Nine (9) Pages).

*Primary Examiner*—Thomas M Lithgow
(74) *Attorney, Agent, or Firm*—Crowell & Moring LLP

(57) ABSTRACT

A filter device having a filter element which has at least one end disk (19) having axially extending elevations (20) configured in the form of at least one recognizable character, in which the elevations correspond in configuration to passages (35-37) through an intermediate element (23). Behind the intermediate element there is an element (24) which faces the housing (10) of the filter unit and is provided with axially projecting appendages (30, 31) which extend into the passages (35-37) of the intermediate element (23). Intermediate element (23) and element (24) are axially movably mounted on a central mandrel (17), and the appendages (30, 31) can be pushed axially by the filter element (12) out of the passages (35-27) of the intermediate element (23) so that intermediate element (23) and element (24) can rotate relative to each other and move axially and the filter element can be moved to its fully installed position.

4 Claims, 4 Drawing Sheets

U.S. PATENT DOCUMENTS 6,458,269 B1 * 10/2002 Bassett et al. ............... 210/119
2004/0144710 A1    7/2004 Bassett et al.

FOREIGN PATENT DOCUMENTS

| EP | 0 442 365 A2 | 8/1991 |
| EP | 0 532 161 A1 | 3/1993 |
| WO | WO 90/02597 A1 | 3/1990 |

* cited by examiner

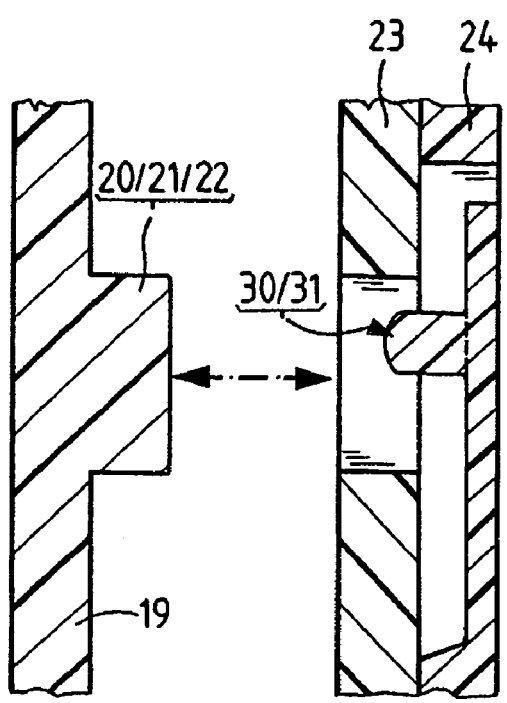
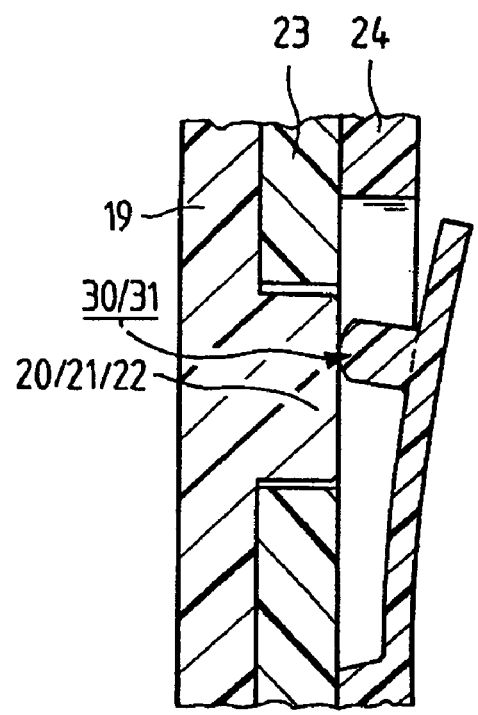
Fig.1a  Fig.1b

FILTER DEVICE

BACKGROUND OF THE INVENTION

This invention relates to a filter device for filtering liquids or gases comprising a housing that can be opened and a filter element disposed in the housing.

Published U.S. patent application Ser. No. US 2002/0170279 describes a filter unit which has a filter element situated in a housing. The connection between the housing and the filter element is accomplished via defined gear teeth and/or a geometric embodiment of the end disk of the filter element. One disadvantage of the known device is that a defined correlation of certain element contours to the housing is impossible. Therefore, an element not having the required contour can easily be installed in the housing. Consequently, incorrect parts can be installed in the existing housing. Likewise, parts that fail to meet requirements with regard to filtration properties can also be installed.

Published German patent application no. DE 44 02 836, for example, describes an arrangement in which the correct use of suitable replacement parts is ensured by the fact that the respective part for attachment can be attached to the unit only according to a lock-and-key principle. However, there is still the problem here that careless use of replacement parts could result in a shortened lifetime or impaired functioning of the units. Furthermore, improper use or consequences thereof are difficult or impossible to detect and correction of a mistake is relatively difficult.

Furthermore, published international patent application no. WO 01/52185 discloses a method of monitoring high-maintenance replacement parts on a unit, in which a memory module in the form of a transponder, for example, is arranged on a filter element to transmit the correct use and to transmit the filter properties at the same time. However, this method requires an additional analyzer unit to display the data.

SUMMARY OF THE INVENTION

It is an object of the present invention to provide an improved filter device comprising a replaceable filter element installed in a housing.

Another object of the invention is to provide a filter device which establishes a definitive correlation between the filter housing and an installed filter element.

A further object of the invention is to provide a filter device which prevents installation of an incorrect filter element.

These and other objects are achieved in accordance with the present invention by providing a filter device for filtering liquids or gases comprising a housing that can be opened and a filter element disposed in the housing, wherein the filter element comprises a first element which at least partially covers the outer structure, and on the housing there is a second element which operatively engages the first element covering the outer structure, and wherein an intermediate element is provided, the intermediate element being equipped with openings such that an operative engagement is established between the first and second elements only when a contour of the first element at least substantially corresponds to the contour of the openings in the intermediate element.

An advantage of the present invention is that the filter element has a certain structure which is operatively connected to an element on the housing. Furthermore, an intermediate element having certain openings is provided. The filter element, specifically its contour, must penetrate into these openings so that the operative connection with the housing is established.

In one embodiment of the present invention, the contour of the openings has a certain shape which corresponds, for example, to the shape of a recognizable character such as a graphic trademark, a logo or a written character. This creates the possibility of using identifiers already present on the filter element as a contour. If no identifier has yet been provided on the filter element, there is the option with this embodiment of the present invention to apply such identifiers while forming the required contour at the same time.

In accordance with another embodiment of the present invention, the filter element is a round or cylindrical filter element having a filter member constructed of a zigzag pleated filter medium. One of the axial end disks required in such a cylindrical filter element carries the outer structure, i.e., the required contour.

In accordance with yet another embodiment of the present invention, a central mandrel is provided on the housing, with the intermediate element being movably mounted thereon along with the element which is in operative engagement with the end disk of the filter element.

In accordance with another embodiment, the central mandrel is equipped with guide grooves. The elements arranged on the central mandrel have inwardly projecting parts which engage in the grooves so that movement of the middle element as well as movement of the element based on the housing in operative connection is possible via the grooves.

According to another embodiment of the present invention, the contour has elevations directed axially at the end disk. These elevations reach through the openings in the intermediate element; the element facing the housing has axially extending appendages which engage in the contour of the intermediate element. Upon installation of a proper filter element, these appendages are pushed axially out of the openings in the intermediate element and release a relative movement, for example a relative rotational movement, between at least two elements. This relative movement in turn makes it possible for the filter element to move the elements arranged on the central mandrel into the final required position owing to an axial movement of the two resulting from this.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which:

FIGS. 1a and 1b are enlarged partial view of the filter element end disk, the intermediate element and the disk-shaped element;

DETAILED DESCRIPTION OF PREFERRED EMBODIMENTS

Figure 1:
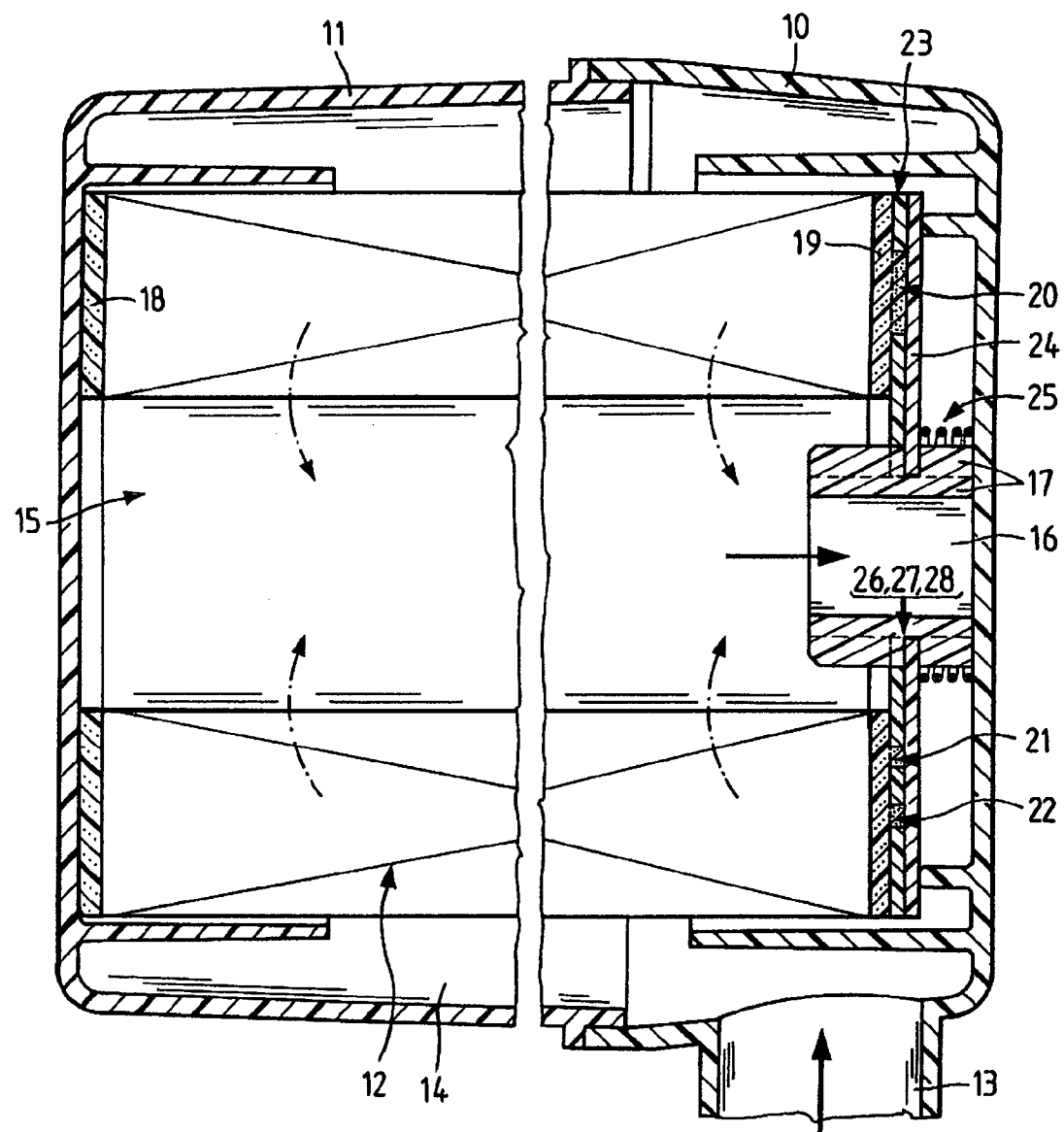
FIG. 1 is a sectional diagram of a filter device according to the invention.

The diagram according to FIG. 1 shows a filter housing 10 which is made, for example, of synthetic resin material and defines a receptacle for a filter element 12. The filter housing 10 is closed by a housing lid. The medium to be filtered, e.g., air, flows through the unfiltered air inlet 13 into the outer unfiltered air chamber 14 of the filter housing, then flows radially through the zigzag pleated filter element and through the active filter layer, leaving the filter unit through the interior 15 and the opening 16 in the central mandrel 17, having been cleaned by its passage through the filter layer. As already mentioned, the filter element 12 is pleated and is made of paper or a nonwoven medium.

The filter element 12 has an end disk 18 and 19 at each end. The end disks are made, for example, of a thermoplastic material. The end disk 19 comprises an axially extending structure of defined elevations and/or recesses 20, 21 and 22, which may, for example, take the form of letters or other recognizable characters. These elevations engage through openings in a so-called intermediate element 23 and are in direct operative connection with a disk-shaped element 24 which is arranged adjacent the filter housing 10 so as to be axially movable.

Both the intermediate element 23 and the disk-shaped element 24 have projections at a central passage. These projections engage in grooves in the central mandrel 17 so that the two elements are guided both axially and radially via the corresponding configuration of the grooves. This structure is described in further detail in conjunction with the other figures.

A compression spring 25 ensures that if no filter element is provided in the housing, the two elements 23 and 24 will lie in contact with a stop on the left side. For a better understanding, the individual disks are shown in FIGS. 2 and 3.

Figure 2A:
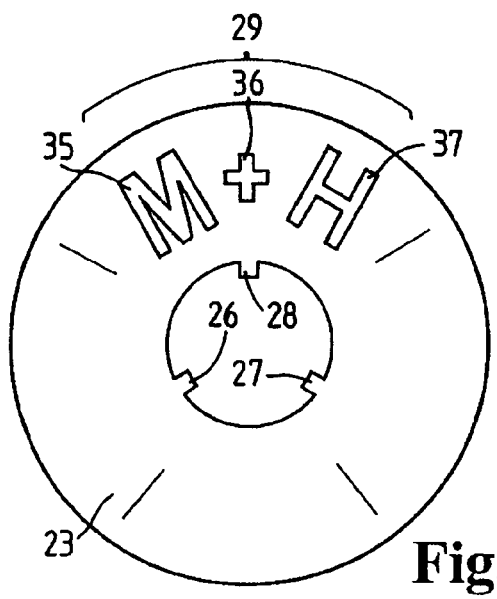
FIGS. 2a and 2b are views of an intermediate element.
Figure 2B:
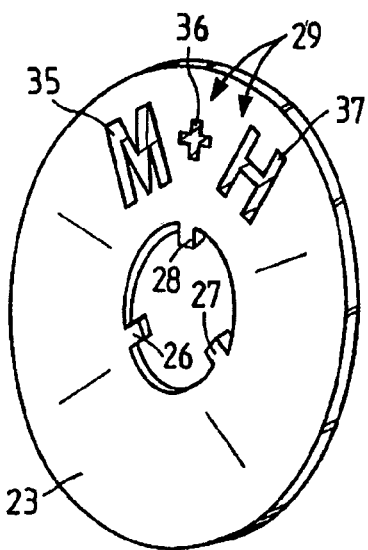

FIG. 2a is a front elevation view of the intermediate element 23. FIG. 2b likewise shows the intermediate element 23 in a perspective view. It can be seen from these drawings that passages 35, 36, 37 are provided through the disk which correspond to the characters M, H and the mathematical "plus" symbol, collectively referred to as letters 29. Furthermore, the disk is provided with radially inwardly directed projections 26, 27, 28 in the central opening. It is assumed that the end disk 19 in FIG. 1 has corresponding elevations which register with the passages arranged on the intermediate element 23 and therefore can engage in these passages.

Figure 3A:
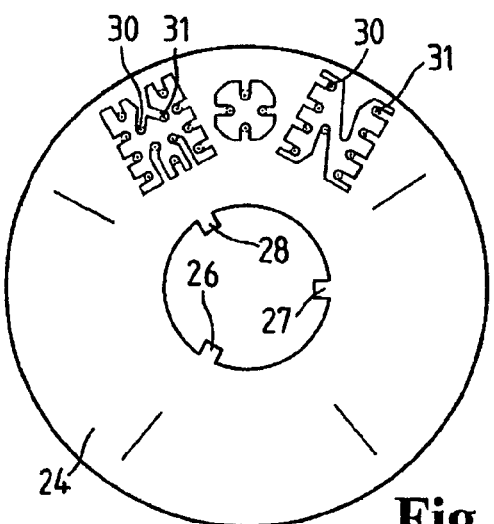
FIGS. 3a and 3b are two views of a disk-shaped element provided for the filter housing.
Figure 3B:
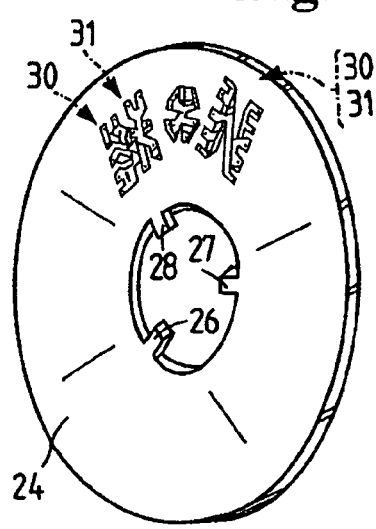

FIGS. 3a and 3b show the disk-shaped element 24, which also has inwardly directed projections 26, 27, 28. Furthermore, the element 24 has resiliently mounted pin-like appendages 30 and 31 which extend out of the plane of the disk 24, as well as a number of other projections which are also resiliently mounted and arranged in the axial direction. If the element 23 rests against the element 24, then the pin-like appendages 30, 31 engage in passages of the written characters of the intermediate element 23 when in the correct position and thereby prevent a relative rotational movement between the two disks 23 and 24. Only when the projecting appendages 30, 31 are pushed by the end disk 19, i.e., by the letter-shaped elevations or configurations 20 on the end disk 19, in the axial direction out of the letter-shaped passageways of the intermediate disk 23 is it possible for the two disks 23 and 24 to rotate relative to each other. This means that the end disk 19 represents the key, so to speak, with which the lock comprised of the disks 23 and 24 can be unlocked.

Figure 4A:
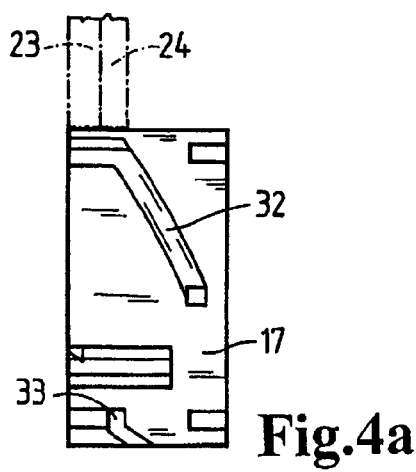
FIGS. 4a and 4b are a side elevational view and a perspective view, respectively, of a central mandrel to be arranged on the filter housing.
Figure 4B:
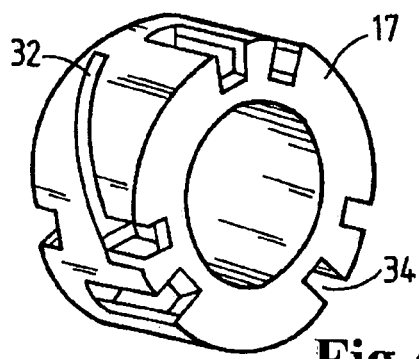

The central mandrel 17 which is shown in FIGS. 4a and 4b also plays an important role in this unlocking. This central mandrel has three grooves 32, 33, 34 which are arranged distributed around the circumference of the mandrel and serve to guide the projections 26, 27 and 28. If there is no filter element in the housing according to FIG. 1, then the two elements 23 and 24 are in the position indicated schematically in FIG. 4a. The engagement of the end disk 19 in the two elements causes the element 24 to be moved into the obliquely extending groove areas and to be shifted to the ends of the groove, which can be seen at the right side in FIG. 4a, owing to the unlocking effect due to the axial movement of the filter element.

Figure 5:
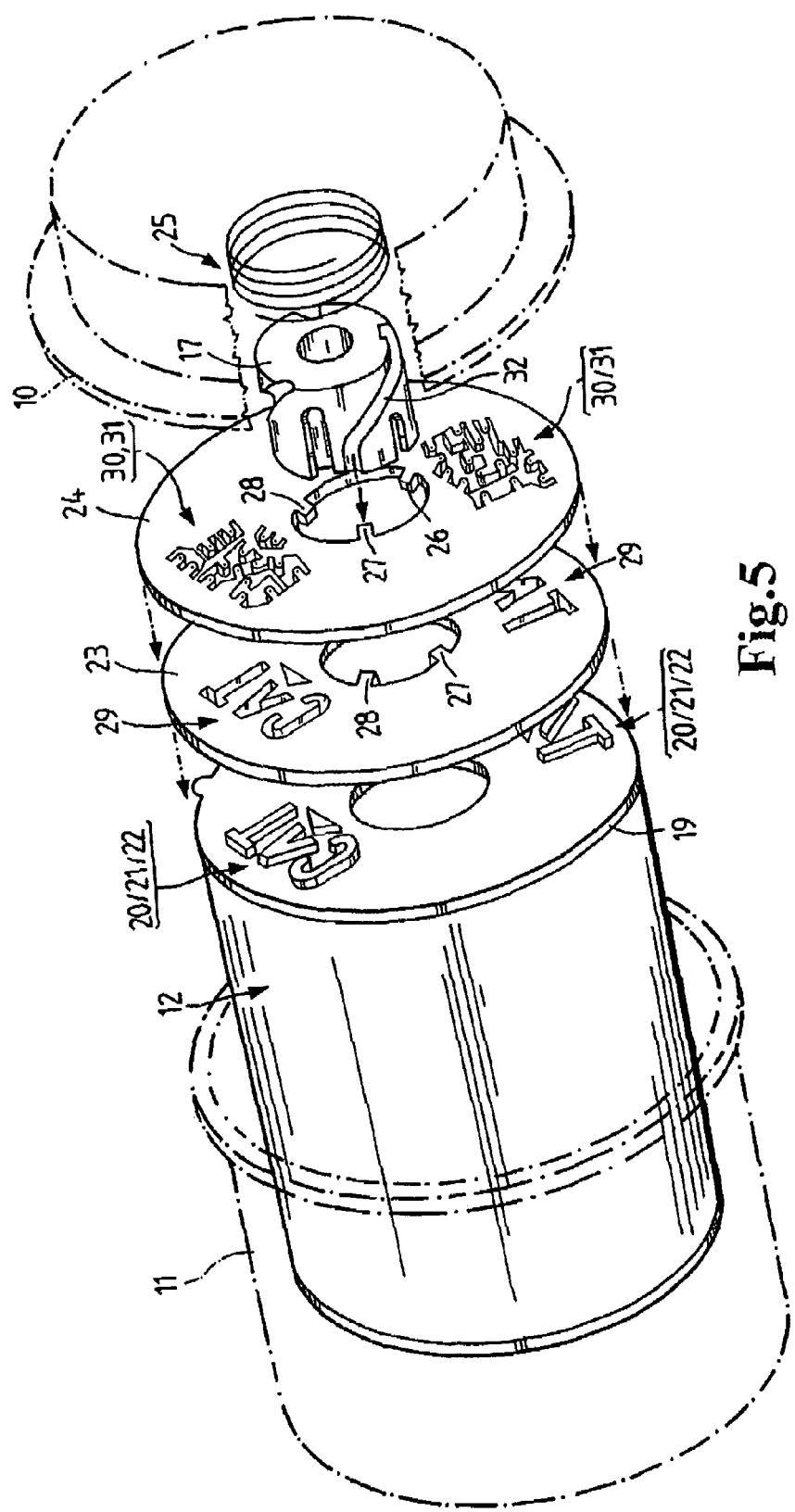
FIG. 5 is a three-dimensional exploded diagram of the components of a filter device according to the invention.

FIG. 5 shows the individual elements again, this time in an exploded diagram. Like parts are identified by the same reference numerals. The compression spring is installed with the central mandrel in the filter housing 10. The two elements 23 and 24 are mounted on the central mandrel and are secured axially to prevent a movement in the direction toward the filter element 12. The logo of the manufacturer, for example, is depicted as an elevated design on the inside of the filter element and has a height of 5 mm, for example. When the filter element is installed in the housing, this logo extends into the passages in the intermediate element 23 which is 5 mm thick. Behind this intermediate disk 23 is the disk-shaped element 24 with the corresponding pin-shaped appendages 30 and 31. Because of the inwardly projecting cams 26, 27 and 28, which are mounted on the part 24 at the center of the disk in combination with the central mandrel 17 which has an inclined plane in the groove 32, a rotational movement is necessary for the filter element to achieve its final position. However, this rotational movement is initially prevented by the engagement of the pin-shaped appendages in the contour of the logo in the element 23, because this also has cams 26, 27 and 28 which allow only a linear movement. This blockage is canceled only when the appendages 30 and 31 are actuated or retracted from the mask of the element 23 by the protruding logo of the filter element end disk 19. Due to the yielding of the element 24 which is possible due to the rotation, the entire mechanism can now be brought into the final position required for the filter element.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter device for filtering liquids or gases comprising a housing that can be opened and a filter element disposed in the housing, wherein the filter element comprises a first element which at least partially covers an outer structure, and on the housing there is a second element which operatively engages the first element covering the outer structure, and wherein an intermediate element is provided, said intermediate element being equipped with openings such that an operative engagement is established between the first and second elements only when a contour of the first element at least substantially corresponds to the contour of the openings in the intermediate element, wherein the filter element is an essentially cylindrical filter element comprising a zigzag pleated filter medium, and the filter medium is connected to axial end disks, and one of the axial end disks simultaneously serves as the element covering the outer structure, and wherein the inside contour of the housing facing the end disk which serves as the element covering the outer structure is provided with a central mandrel, and the intermediate element and the second element which operatively engages the element covering the outer structure are axially movably mounted on the central mandrel.

2. A filter device according to claim 1, wherein the contour of the openings in the intermediate element corresponds at least one recognizable character.

3. A filter device according to claim 1, wherein the central mandrel is provided with guide grooves, and the intermediate element and the second element each have inwardly extending protrusions which engage in said guide grooves, whereby the operative connection between the three elements allows movement of the two elements mounted on the central mandrel.

4. A filter device according to claim 3, wherein the end disk of the filter element is provided with axially extending elevations, the intermediate element is provided with passages corresponding to the elevations on the end disk, and said second element faces the housing and is situated directly behind the intermediate element and is provided with projecting appendages which fit into the passages of the intermediate element, and wherein said appendages can be pushed axially out of the passages of the intermediate element by the elevations on the end disk of the filter element, so that the two elements arranged on the central mandrel can move axially to allow the filter element to moved to a fully installed position.

* * * * *